(Model.)

C. A. RAGGIO.
Faucet Attachment.

No. 228,219.  Patented June 1, 1880.

Witnesses.
Wm Zimmerman
N. Cowles

Inventor.
Charles A. Raggio.
By Gridley & Co
Attys.

UNITED STATES PATENT OFFICE.

CHARLES A. RAGGIO, OF CHICAGO, ILLINOIS.

FAUCET ATTACHMENT.

SPECIFICATION forming part of Letters Patent No. 228,219, dated June 1, 1880.

Application filed March 1, 1880. (Model.)

*To all whom it may concern:*

Be it known that I, CHARLES A. RAGGIO, of Chicago, in the county of Cook and State of Illinois, have invented new and useful Improvements in Faucet Attachments or Cask-Stoppers; and I hereby declare the following to be a full, clear, and exact description thereof, which will enable others skilled in the art to which my invention appertains to make and use the same, reference being had to the accompanying drawings, forming a part hereof, and in which—

Figure 1:
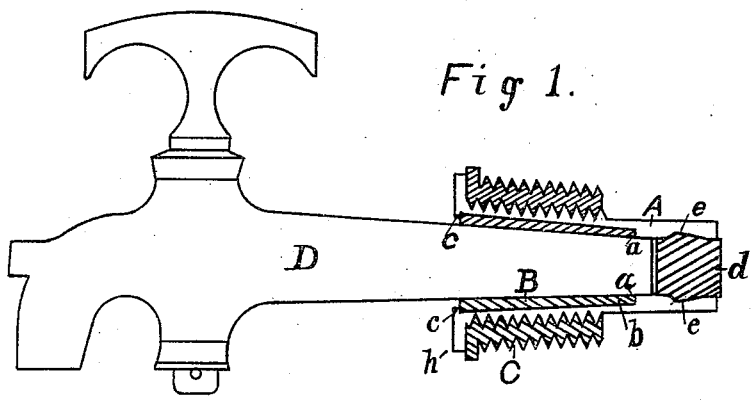
Figure 2:
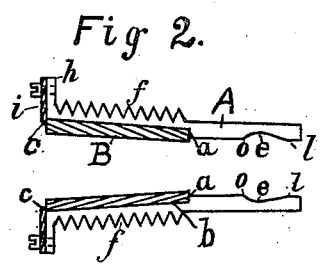

Figure 2 represents a longitudinal central sectional view of my improved faucet attachment or cask-stopper, and Fig. 1 represents the same as attached to a screw-threaded bung-bushing.

Like letters of reference indicate like parts.

My invention relates to that class of tubular and screw-threaded cask-stoppers which are removably attached within the bung-holes of casks, barrels, or kegs, with or without a screw-threaded metal bushing, and which are closed by means of a cork and opened by inserting the stem of a faucet therein; and my invention consists in the construction and combination of the several parts, as hereinafter described and claimed.

In the drawings, A represents a hollow conical plug, provided with a screw-thread, $f$, and flange $h$ upon its exterior, and having an annular chamber or recess, $b$, extending from the shoulder $a$ forward to the flange $c$.

$e$ represents an annular channel or groove, so formed that the inner edge, $l$, shall taper gradually into the bore of the plug, and its outer edge, $o$, shall turn more abruptly into the bore of the plug, so as to form a rounding shoulder, as shown.

B represents a tubular elastic bushing, made of either rubber, leather, or other equivalent elastic material or fabric, which is arranged within the chamber of the bore so as to form a water-tight packing against the exterior of the faucet-stem when inserted within the plug A.

If desired, the plug may be constructed without the flange or shoulder $c$, and in its place and for the same purpose may be used an annular metal disk, $i$, as shown in Fig. 2, having the diameter of its opening somewhat smaller than the diameter of the chamber $b$, and which may be removably attached to the face of the flange $h$ by means of screws, and thereby hold the packing securely within the orifice of the plug A.

The operation of my improved faucet attachment is as follows: The plug A is screwed directly into the cask, or it may be screwed into a bushing, C, previously screwed into the cask, and threaded to fit the exterior threads of plug A, which is to be a permanent fixture to the cask. After the cask or keg has been filled with its desired contents, and before the plug A is inserted therein, a suitable elastic cork, $d$, is forced into the stem of the plug A, as shown. When it is desired to tap the cask the stem of the faucet D is inserted into the attachment or plug A and driven in until the cork $d$ is driven out into the cask, the packing B yielding to and clasping the stem of the faucet, and at the same time forming a tight joint between the plug and faucet. The sides of the cork $d$ swell into the chamber $e$ and the shoulders at $o$ hold it securely against its being accidentally driven out.

Having thus described my invention, what I claim as new, and desire to secure by Letters Patent, is—

The tubular and screw-threaded plug or cask-stopper A, provided with a shoulder, $a$, and flange or shoulder $c$, in combination with a tubular and elastic packing, B, arranged within the chamber $b$ of the plug A, substantially as shown and described.

CHARLES A. RAGGIO.

Witnesses:
WM. ZIMMERMAN,
N. COWLES.